(12) United States Patent
Sakaguchi et al.

(10) Patent No.: US 12,244,181 B2
(45) Date of Patent: Mar. 4, 2025

(54) MOTOR

(71) Applicant: TOYOTA JIDOSHA KABUSHIKI KAISHA, Toyota (JP)

(72) Inventors: Reimi Sakaguchi, Nisshin (JP); Daisuke Ichigozaki, Toyota (JP); Masaaki Ito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 17/659,117

(22) Filed: Apr. 13, 2022

(65) Prior Publication Data

US 2022/0337108 A1 Oct. 20, 2022

(30) Foreign Application Priority Data

Apr. 14, 2021 (JP) .................................. 2021-068152

(51) Int. Cl.
*H02K 1/276* (2022.01)
*H02K 21/14* (2006.01)

(52) U.S. Cl.
CPC ............. *H02K 1/276* (2013.01); *H02K 21/14* (2013.01)

(58) Field of Classification Search
CPC ...... H02K 1/2766; H02K 1/276; H02K 21/14; H02K 1/27
USPC ........................................ 310/156.56, 156.57
See application file for complete search history.

(56) References Cited

U.S. PATENT DOCUMENTS

| 8,502,430 B2 * | 8/2013 | Yamada | H02K 1/2746 |
|---|---|---|---|
| | | | 310/156.55 |
| 2020/0228038 A1 * | 7/2020 | Takahashi | H02K 1/16 |
| 2020/0244121 A1 | 7/2020 | Takahashi | |

FOREIGN PATENT DOCUMENTS

| JP | 2010283978 A | | 12/2010 |
|---|---|---|---|
| JP | 2016082798 A1 | | 5/2016 |
| JP | 2018098936 A | * | 6/2018 |
| JP | 2019030207 A | | 2/2019 |

OTHER PUBLICATIONS

Machine Translation of Ikemoto JP-2018098936-A (Year: 2018).*

* cited by examiner

*Primary Examiner* — Quyen P Leung
*Assistant Examiner* — Charlie Frank Mann, Jr.
(74) *Attorney, Agent, or Firm* — Dickinson Wright, PLLC

(57) ABSTRACT

Provided is a motor capable of increasing a torque while suppressing an increase in the physical size of the motor. A motor includes a rotor. The rotor includes pairs of magnet slots evenly spaced in a circumferential direction, each pair of magnet slots being arranged in a V-shape, pairs of main magnets housed in the pairs of magnet slots, and a plurality of auxiliary magnets including an outer magnet housed in an outer end in the circumferential direction in each of the pairs of magnet slots. The motor satisfies at least one of a first condition that the main magnets are sintered magnets and the auxiliary magnets are bonded magnets, or a second condition that magnetization directions of the main magnet and the outer magnet housed in the same magnet slot intersect outside in the radial direction so as to define an acute angle.

2 Claims, 14 Drawing Sheets

MOTOR

CROSS REFERENCE TO RELATED APPLICATIONS

The present application claims priority from Japanese patent application JP 2021-068152 filed on Apr. 14, 2021, the entire content of which is hereby incorporated by reference into this application.

BACKGROUND

Technical Field

The present disclosure relates to an interior permanent magnet motor having a rotor with permanent magnets embedded therein.

Background Art

Conventionally, an invention relating to an electric motor and a rotor thereof is known (see JP 2010-283978 A below). Such a conventional rotor of the electric motor includes a shaft as a rotating axis, a yoke formed on the outer circumference of the shaft and rotating integrally with the shaft, and a plurality of rare-earth permanent magnets arranged at regular intervals in the circumferential direction of the outer circumference of the yoke. The plurality of rare-earth permanent magnets are arranged so as to be separated from each other at predetermined intervals, and a bonded magnet is molded on the outer circumference of the yoke so as to be integrated with the rare-earth permanent magnet (JP 2010-283978 A, Abstract, paragraph 0007, claim 1, etc.).

According to this conventional rotor, rare-earth permanent magnets capable of generating strong magnetic force are arranged so as to be separated from each other at predetermined intervals, and a bonded magnet is molded so as to be integrated with the rare-earth permanent magnet. Therefore, even if there are individual differences in the rare-earth permanent magnets, the bonded magnet molded so as to be integrated with the rare-earth permanent magnet can suppress the torque fluctuation due to the individual difference or positional deviation of the rare-earth permanent magnet (JP 2010-283978 A, paragraph 0008, etc.).

Conventionally, also an invention relating to a magnetic generator for an electric motor is known (see JP 2019-30207 A below). Such a conventional magnetic generator for an electric motor is applied to an electric motor including a plurality of magnets arranged on the positions opposed to the winding and capable of performing relative operation to the winding by energization of the winding, in which the plurality of magnets are arranged so as to alternate their polarities in an operation direction of the relative operation (JP 2019-30207 A, Abstract, claim 1, paragraph 0011, etc.).

These magnets include a first magnet portion provided as a pair of magnets in a state where the magnets are spaced from each other on the opposite sides of a d-axis as a center of the magnetic pole and a second magnet portion provided at the ends of the pair of magnets in the first magnet portion adjacent to the d-axis. In the first magnet portion, a magnetization direction inside of the magnet is inclined with respect to the d-axis, and is configured to intersect the d-axis at a position close to the winding, out of the position close to the winding and the position opposite to the winding. In the second magnet portion, a magnetization direction is configured to intersect the magnetization direction of the first magnet portion.

With such a configuration, the aforementioned conventional magnetic generator for an electric motor can enhance the magnetic flux of the end of the first magnet portion with the second magnet portion. Therefore, the demagnetization resistance against the mutual interference of the magnetic flux in the vicinity of the d-axis is increased, and the demagnetization of the first magnet portion can be appropriately suppressed (JP 2019-30207 A, paragraph 0012).

SUMMARY

Generally, conventional IPM (Interior Permanent Magnet) motors need to have a larger amount of magnets in order to increase both a magnetic torque, which largely depends on the quantity of magnetic flux of magnets, and a reluctance torque, which is generated due to the difference in the inductance between the q-axis and the d-axis. Increasing the amount of magnets may reduce the strength of the motor due to a thinner rotor or may cause an increase in the physical size of the motor.

The present disclosure provides a motor capable of increasing a torque while suppressing an increase in the physical size of the motor.

One aspect of the present disclosure is a motor including a rotor and a stator disposed around the rotor. The rotor includes: a plurality of pairs of magnet slots evenly spaced in a circumferential direction of the rotor, each pair of magnet slots being arranged in a V-shape opening outward in a radial direction of the rotor; a plurality of pairs of main magnets housed in the plurality of pairs of magnet slots with their polarities alternately reversed in the circumferential direction so that a north pole and a south pole alternately face outward in the radial direction; and a plurality of auxiliary magnets including an outer magnet housed in an outer end in the circumferential direction in each of the pairs of magnet slots. At least one of a first condition or a second condition is satisfied. The first condition is that the main magnets are sintered magnets and the auxiliary magnets are bonded magnets and the second condition is that magnetization directions of the main magnet and the outer magnet housed in a same one of the magnet slots intersect outside in the radial direction so as to define an acute angle.

With such a configuration, when the first condition is satisfied, the motor of the above aspect can omit a resin mold for fixing the main magnet, and can fix the main magnet by filling a bonded magnet into the magnet slot instead of using the resin mold. Therefore, according to the motor satisfying the first condition, by replacing the resin mold with the bonded magnet, the rotor does not need to be thinner or larger in size for the arrangement of the auxiliary magnets, and thus it is possible to increase a magnetic torque while suppressing an increase in the physical size of the motor.

In addition, when the second condition is satisfied, the motor of the above aspect can increase a magnetic torque as compared to the case where the second condition is not satisfied. That is, by defining the magnetization directions of the main magnet and the auxiliary magnet, the motor satisfying the second condition can increase a magnetic torque without increasing a magnet amount as compared to the motor not satisfying the second condition. Therefore, the motor satisfying the second condition can increase a magnetic torque while suppressing an increase in the physical size of the motor.

In addition, in the motor of the above aspect, the second condition may be satisfied, the plurality of auxiliary magnets may include a plurality of inner magnets housed in inner ends in the circumferential direction in each of the pairs of magnet slots, and the main magnet and the inner magnet housed in the same one of the magnet slots may be magnetized in the same direction. With such a configuration, the motor of the above aspect can increase a magnetic torque of the motor with the inner magnets. In addition, when the first condition is further satisfied, the motor of the above aspect can fix the main magnet by filling a bonded magnet into the magnet slot instead of using the resin mold, and increase a magnetic torque while suppressing an increase in the physical size of the motor, as described above.

In addition, in the motor of the above aspect, only the first condition may be satisfied, and the main magnet and the outer magnet housed in the same one of the magnet slots may be magnetized in the same direction. The outer magnet disposed at the outer end in the circumferential direction in each pair of the magnet slots has a larger contribution to the torque as compared to the auxiliary magnet disposed in a different position. Therefore, even if the main magnet and the outer magnet are magnetized in the same direction, the motor of the above aspect can increase a magnetic torque while suppressing an increase in the physical size of the motor by replacing the resin mold with the bonded magnet.

In addition, in the motor of the above aspect satisfying only the first condition, the plurality of auxiliary magnets may include a plurality of inner magnets housed in inner ends in the circumferential direction in each of the pairs of magnet slots, and the main magnet and the inner magnet housed in the same one of the magnet slots may be magnetized in the same direction. With such a configuration, the motor of the above aspect can increase a magnet amount and increase a magnetic torque while suppressing an increase in the physical size of the motor by replacing the resin mold with the inner magnet that is the bonded magnet.

In the motor of the above aspect satisfying the first condition, the magnet slots each may include extended portions at opposite ends thereof in the circumferential direction, and bonded magnets may be housed in at least part of the extended portions. With such a configuration, the motor of the above aspect can increase a magnetic torque while suppressing an increase in the physical size of the motor by filling the bonded magnet into the space of the extended portion or replacing the resin mold to be filled into the extended portion with the bonded magnet. In addition, since an uncured bonded magnet can be filled into the extended portion, the motor of the above aspect can house the auxiliary magnet, without a gap, in the extended portion having a complex shape.

According to the present disclosure, it is possible to provide a motor capable of increasing a torque while suppressing an increase in the physical size of the motor.

DETAILED DESCRIPTION

Hereinafter, embodiments of the motor according to the present disclosure will be described with reference to the drawings.

First Embodiment

Figure 1:
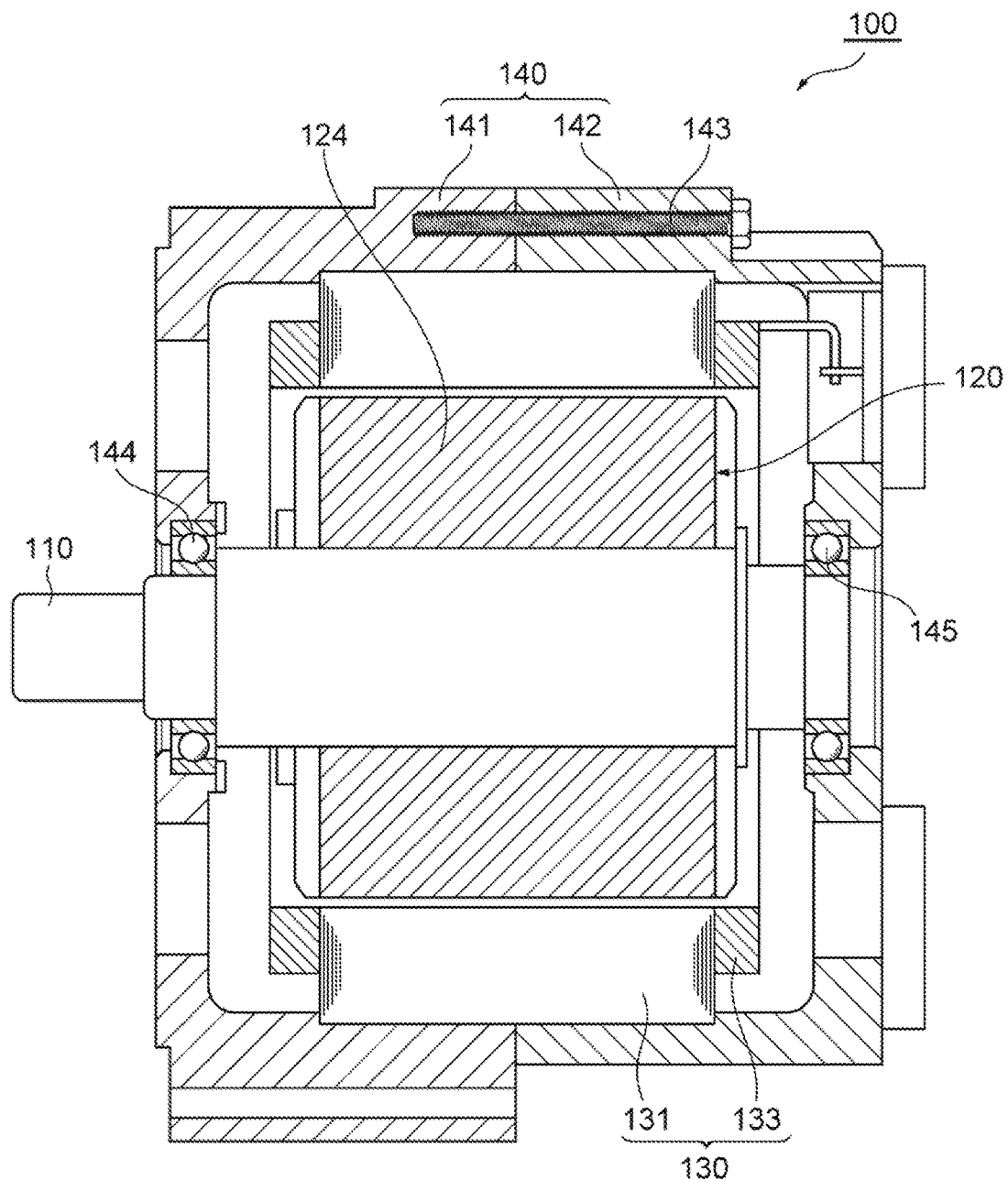
FIG. 1 is a vertical cross-sectional view showing a first embodiment of a motor according to the present disclosure.
Figure 2:
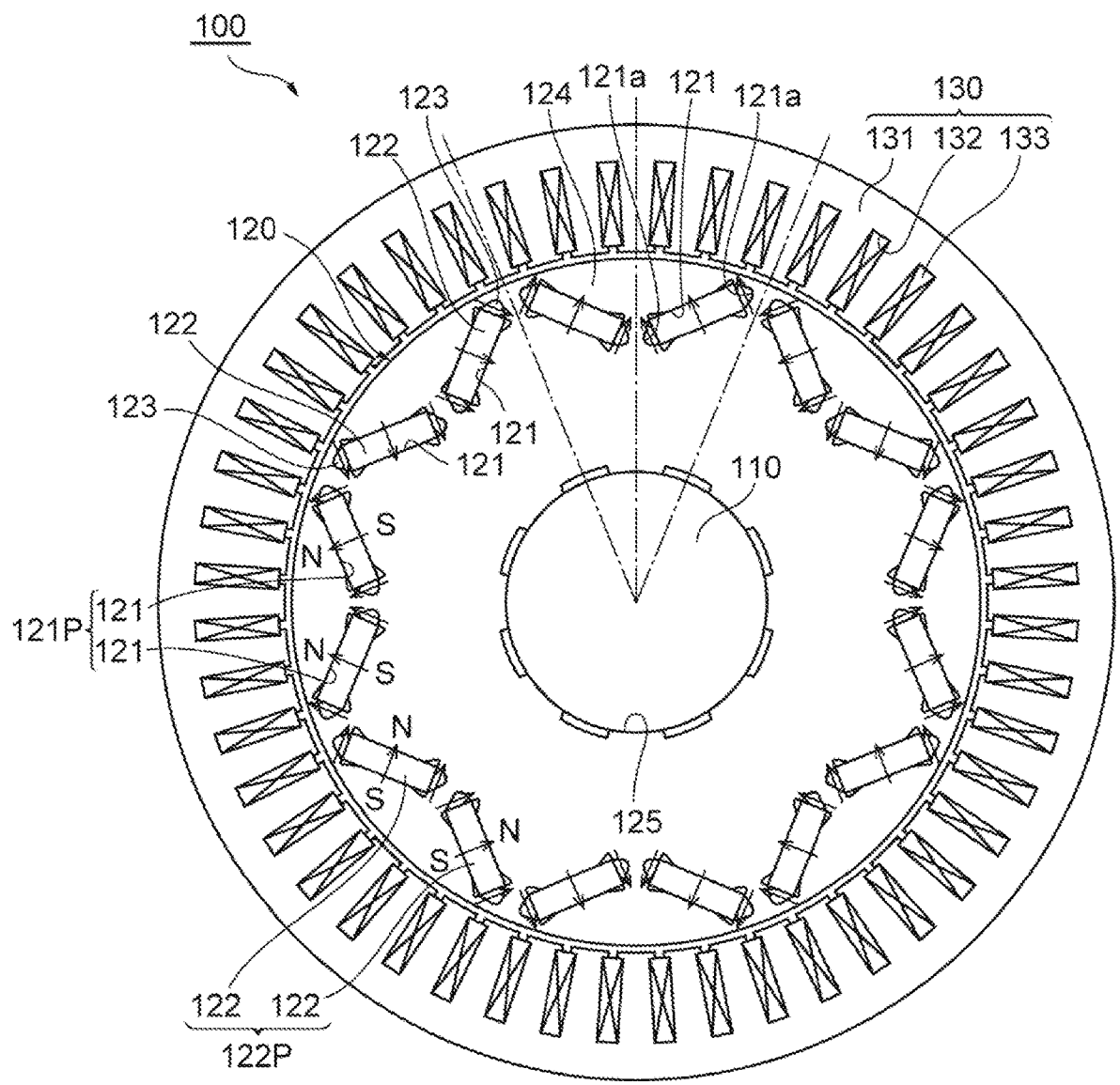
FIG. 2 is a transverse cross-sectional view of a rotor and a stator of the motor shown in FIG. 1.

FIG. 1 is a vertical cross-sectional view showing a first embodiment of the motor according to the present disclosure. FIG. 2 is a transverse cross-sectional view of a rotor 120 and a stator 130 in the cross section perpendicular to a rotary shaft 110 of a motor 100 shown in FIG. 1. In the following descriptions, the direction parallel to the rotary shaft 110 is expressed as an axial direction. The direction parallel to the diameter of the circumference around the rotary shaft 110 is expressed as a radial direction. The direction along the circumference around the rotary shaft 110 is expressed as a circumferential direction.

The motor 100 of the present embodiment is an IPM (Interior Permanent Magnet) motor that is mounted on vehicles, such as hybrid vehicles, electric vehicles, or hydrogen vehicles, for example, and generates a driving force for traveling the vehicles. The motor 100 includes, for example, a rotary shaft 110, a rotor 120 fixed to the rotary shaft 110, a stator 130 disposed around the rotor 120, and a housing 140 for housing the rotor 120 and the stator 130.

The rotor 120 has a cylindrical shape, for example. The stator 130 has an annular or cylindrical shape, for example, and is disposed on the outside of the rotor 120 in the radial direction so as to surround the rotor 120. The rotor 120 and the stator 130 are disposed coaxially with each other, and the outer circumferential surface of the rotor 120 and the inner circumferential surface of the stator 130 face each other in the radial direction. A predetermined air gap is formed between the outer circumferential surface of the rotor 120 and the inner circumferential surface of the stator 130.

The housing 140 includes a pair of housing members 141, 142 having a closed-bottomed cylindrical shape, for example. The pair of housing members 141, 142 is fastened and integrated with each other by a fastening member such as a bolt 143, for example, in a state where their openings are bonded together. The housing 140 has bearings 144, 145 for rotatably supporting the rotary shaft 110 and the rotor 120.

As shown in FIG. 2, the rotor 120 includes, for example, a plurality of magnet slots 121, a plurality of main magnets 122 housed in the plurality of magnet slots 121, and a plurality of auxiliary magnets 123 housed in the plurality of magnet slots 121 together with each of the main magnets 122. More specifically, the rotor 120 includes a rotor core 124 fixed to the rotary shaft 110, and the plurality of magnet slots 121 are disposed in the rotor core 124.

The rotor core 124 is formed in a substantially cylindrical shape by stacking a large number of electromagnetic steel plates, and has a through-hole 125 at its center. The rotary shaft 110 is fitted into the through-hole 125 of the rotor core 124, whereby the rotor core 124 is fixed to the rotary shaft 110. More specifically, the large number of electromagnetic steel plates forming the rotor core 124 are fixed to the rotary shaft 110 by, for example, swaging, welding, an adhesive, a projection and recess structure such as a key and keyway, spline, etc., or press-fitting or the like.

The stator 130 includes a cylindrical stator core 131 including the large number of stacked electromagnetic steel plates, for example. The stator core 131 includes a plurality of slots 132 evenly spaced in the circumferential direction. The slot 132 penetrates the stator core 131 in the axial direction. In the slot 132, a 3-phase stator winding 133 is wound and disposed, for example. In the present embodiment, for example 48 slots 132 are evenly spaced in the circumferential direction such that the 3-phase stator windings 133 corresponding to the number of magnetic poles of the rotor 120 are housed therein.

As will be described in detail later, the motor 100 according to the present embodiment is characterized in that at least one of a first condition or a second condition is satisfied. The first condition is that the main magnets 122 are sintered magnets and the auxiliary magnets 123 are bonded magnets. The second condition is that magnetization directions of the main magnet 122 and the outer magnet 123a included in the auxiliary magnet 123 that are housed in the same magnet slot 121 intersect outside in the radial direction so as to define an acute angle.

Figure 3:
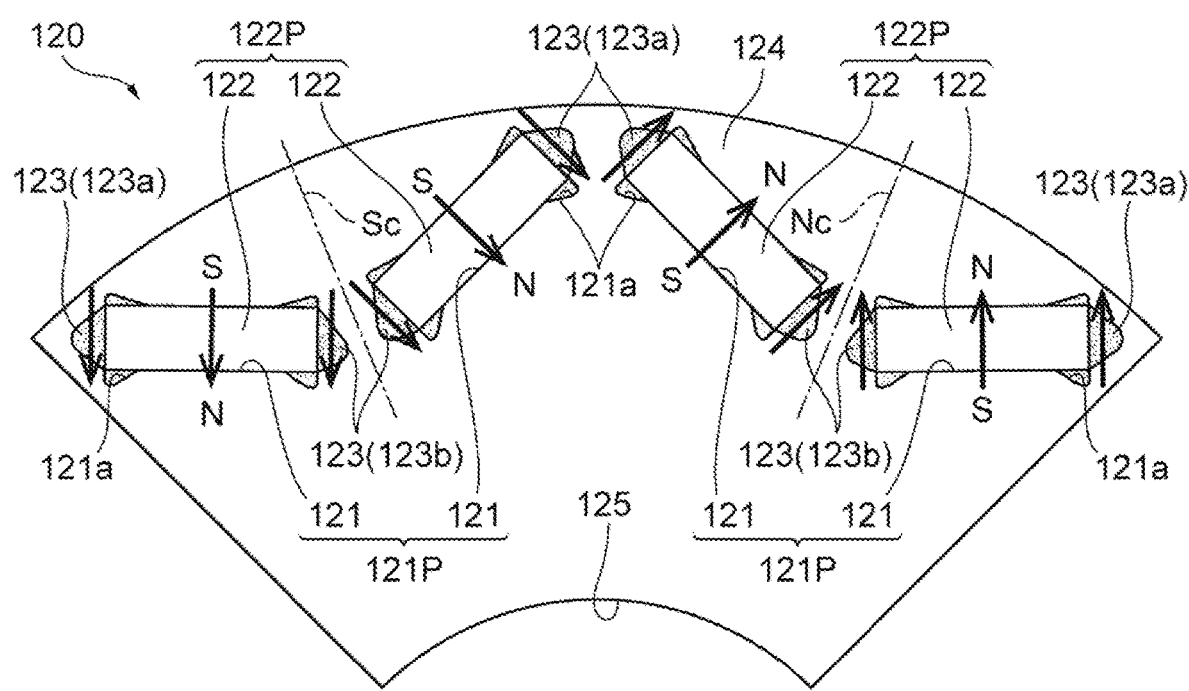
FIG. 3 is an enlarged view of the rotor shown in FIG. 2.

FIG. 3 is an enlarged view of the rotor 120 shown in FIG. 2. It should be noted that FIG. 3 shows an example in which the motor 100 satisfies only the above-described first condition and does not satisfy the above-described second condition. The rotor 120 includes a plurality of pairs 121P of the magnet slots 121, a plurality of pairs 122P of the main magnets 122, and a plurality of auxiliary magnets 123.

The plurality of pairs 121P of the magnet slots 121, each pair 121P of the magnet slots 121 being arranged in a V-shape opening outward in the radial direction of the rotor 120, are evenly spaced in the circumferential direction of the rotor 120. Each magnet slot 121 has a rectangular shape as viewed in the axial direction of the rotary shaft 110 and includes extended portions 121a at the opposite ends thereof in the circumferential direction of the rotor 120. The extended portion 121a extends in the longitudinal direction and the transverse direction of the rectangular magnet slot 121, for example.

The plurality of pairs 122P of the main magnets 122 are housed in the plurality of pairs 121P of the magnet slots 121 with their polarities alternately reversed in the circumferential direction so that the north pole and the south pole alternately face outward in the radial direction. The pair 122P of the main magnets 122 having the north pole facing outward in the radial direction is disposed asymmetrically with respect to the north pole center line Nc extending in the radial direction of the rotor 120. The pair 122P of the main magnets 122 having the south pole facing outward in the radial direction is disposed asymmetrically with respect to the south pole center line Sc extending in the radial direction of the rotor 120. The main magnets 122 are permanent magnets. Examples of the main magnets 122 may include rare-earth sintered magnets, such as neodymium magnets or samarium magnets, ferrite magnets, FCC magnets, or alnico magnets.

The plurality of auxiliary magnets 123 are housed in the extended portions 121a of the magnet slots 121, for example. The plurality of auxiliary magnets 123 include a plurality of outer magnets 123a housed in the outer ends in the circumferential direction in each pair 121P of the magnet slots 121. In addition, in the example shown in FIG. 3, the plurality of auxiliary magnets 123 include a plurality of inner magnets 123b housed in the inner ends in the circumferential direction in each pair 121P of the magnet slots 121.

Furthermore, in the example shown in FIG. 3, the plurality of auxiliary magnets 123 are bonded magnets. That is, in the example shown in FIG. 3, the motor 100 satisfies the above-described first condition that the main magnets 122 are sintered magnets and the auxiliary magnets 123 are bonded magnets. Here, the bonded magnet is prepared by filling a mixture of magnetic particles or powder with a binder, such as a resin, into the magnet slot 121 and then curing the mixture, for example.

In addition, in the example shown in FIG. 3, the main magnet 122 and the outer magnet 123a housed in the same magnet slot 121 are magnetized in the same direction. That is, in the example shown in FIG. 3, the motor 100 does not satisfy the above-described second condition that the magnetization directions of the main magnet 122 and the outer magnet 123a housed in the same magnet slot 121 intersect outside in the radial direction so as to define an acute angle.

Here, the magnetization direction of the bonded magnet can be controlled by filling a mixture of magnetic particles or powder and a binder, such as a resin, into the magnet slot 121 and then curing the mixture while applying a magnetic field in a direction equal to the magnetization direction, for example. It should be noted that a method for controlling the magnetization direction of the bonded magnet is not particularly limited as long as the magnetization direction of the bonded magnet can be controlled in a desired direction. For example, the bonded magnet may be formed into the shape of the magnet slot 121 beforehand and magnetized in a predetermined direction, and then inserted into the magnet slot 121.

In the example shown in FIG. 3, the bonded magnets as the auxiliary magnets 123 are filled into all of the extended portions 121a of the magnet slots 121 and cured, such that they are housed in all of the extended portions 121a of the magnet slots 121. However, the bonded magnets as the auxiliary magnets 123 may be housed in part of the extended portions 121a of the magnet slots 121.

Figure 4:
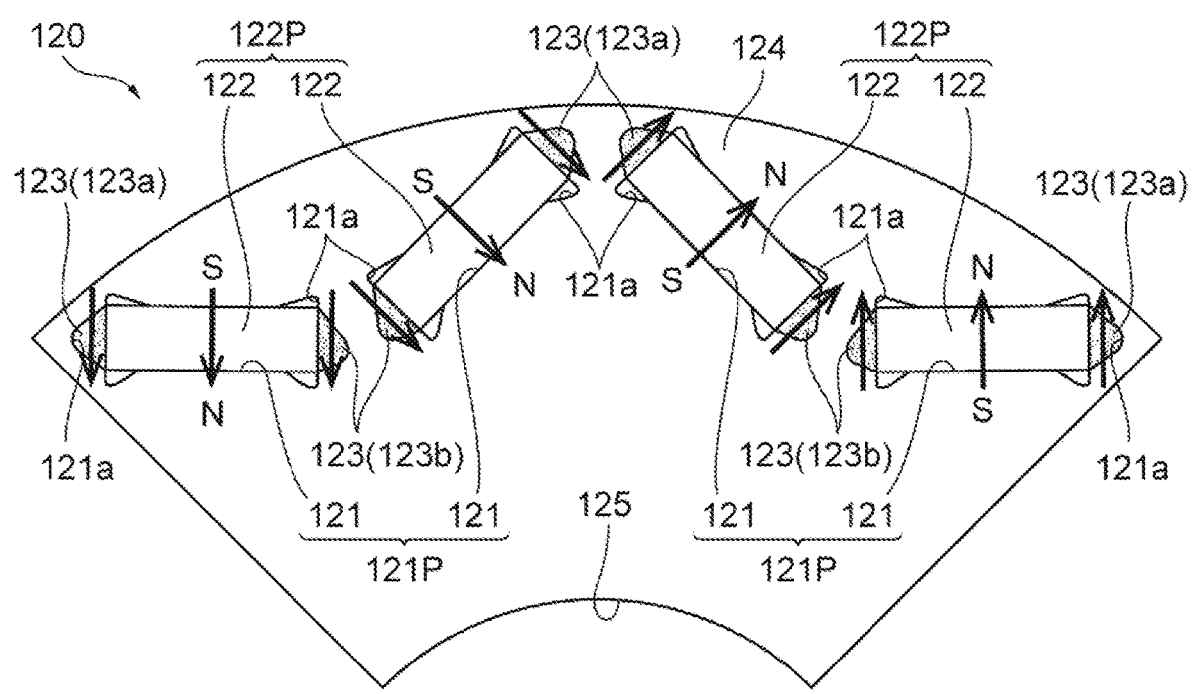
FIG. 4 is an enlarged view of the rotor illustrating Modification 1 of the motor according to the first embodiment of FIG. 3.

FIG. 4 is an enlarged view of the rotor 120 illustrating Modification 1 of the motor 100 according to the first embodiment of FIG. 3. In Modification 1 of the motor 100, the bonded magnets as the auxiliary magnets 123 are housed only in the extended portions 121a of the magnet slots 121 located on the opposite sides of the rectangular main magnets 122 in the longitudinal direction as viewed in the direction parallel to the axial direction of the rotary shaft 110.

In other words, in Modification 1 of the motor 100 shown in FIG. 4, the bonded magnets as the auxiliary magnets 123 are housed only in the inner ends and the outer ends in the circumferential direction in each V-shaped pair 121P of the magnet slots 121. That is, in Modification 1 of the motor 100, the bonded magnets housed in each magnet slot 121 are only the outer magnet 123a and the inner magnet 123b forming the auxiliary magnets 123.

Figure 5:
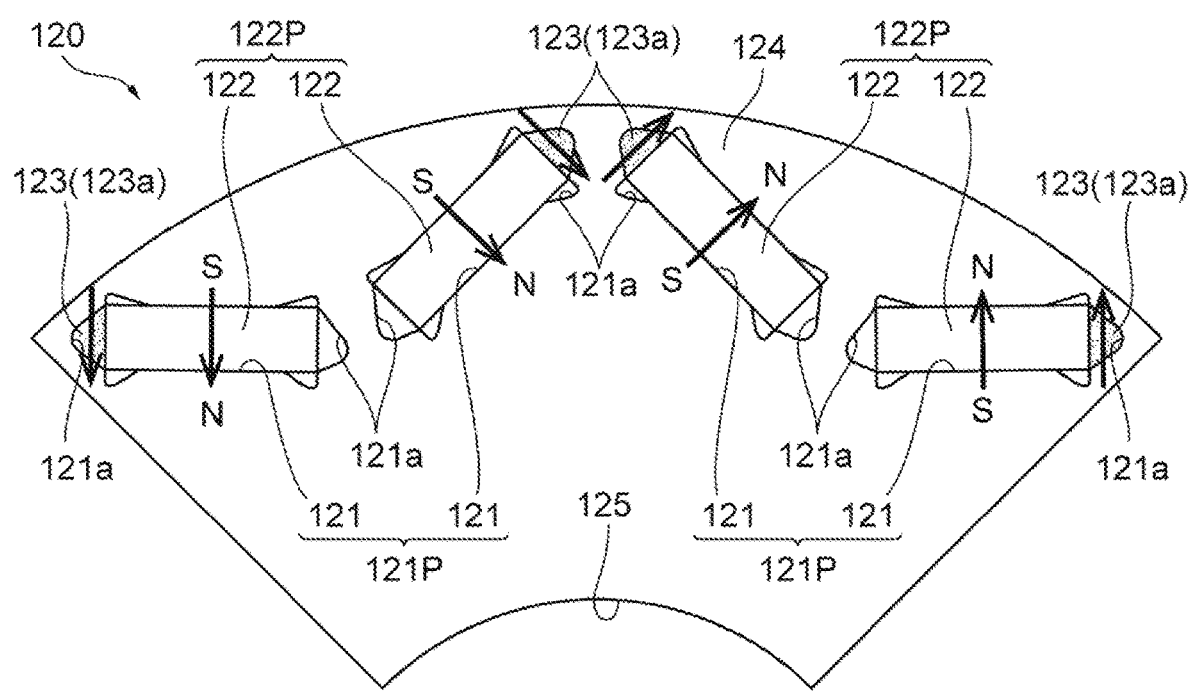
FIG. 5 is an enlarged view of the rotor illustrating Modification 2 of the motor according to the first embodiment of FIG. 3.

FIG. 5 is an enlarged view of the rotor 120 illustrating Modification 2 of the motor 100 according to the first embodiment of FIG. 3. In Modification 2 of the motor 100, the bonded magnets as the auxiliary magnets 123 are housed only in the extended portions 121a of the magnet slots 121 located on the outer side in the circumferential direction in the pair 122P of the main magnets 122 arranged in a V-shape as viewed in a direction parallel to the axial direction of the rotary shaft 110.

In other words, in Modification 2 of the motor 100 shown in FIG. 5, the bonded magnets as the auxiliary magnets 123 are housed only in the outer ends in the circumferential direction in each V-shaped pair 121P of the magnet slots 121. That is, in Modification 2 of the motor 100, the bonded magnet housed in each magnet slot 121 is only the outer magnet 123a forming the auxiliary magnet 123.

Figure 6:
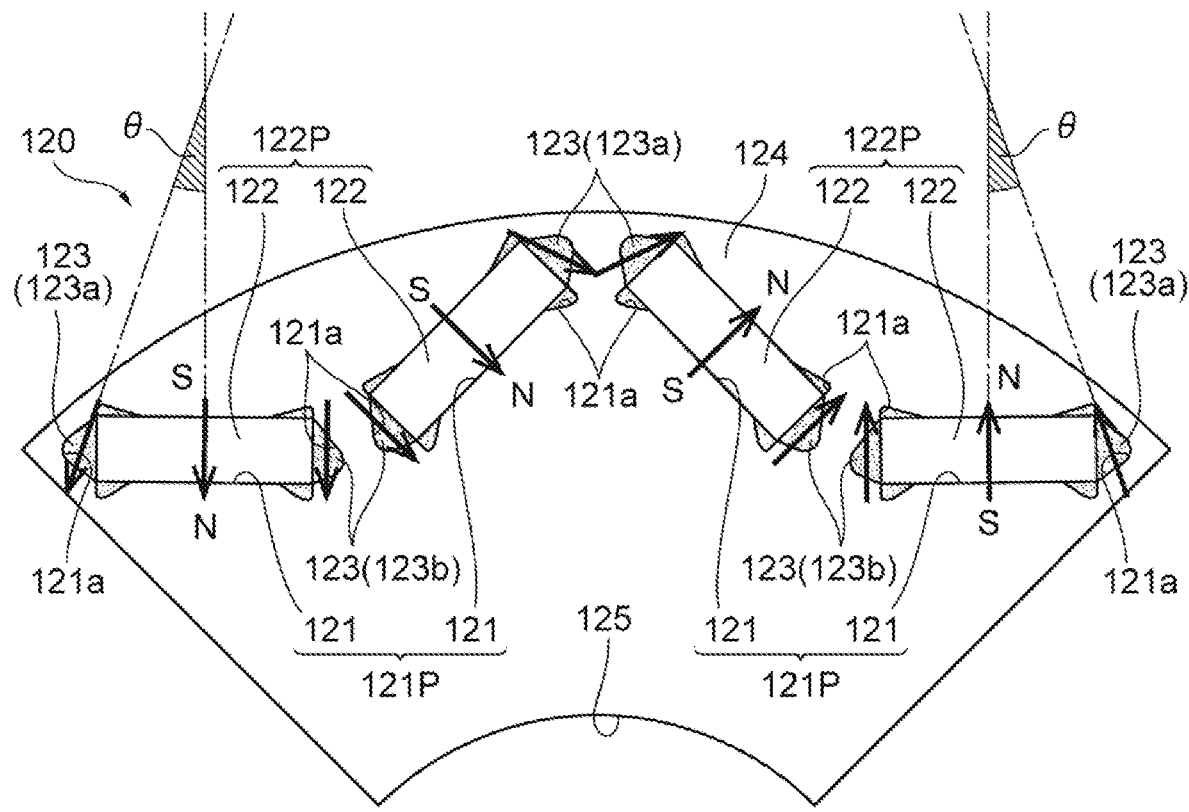
FIG. 6 is an enlarged view of the rotor illustrating Modification 3 of the motor according to the first embodiment of FIG. 3.

FIG. 6 is an enlarged view of the rotor 120 illustrating Modification 3 of the motor 100 according to the first embodiment of FIG. 3. In Modification 3 of the motor 100, the motor 100 satisfies both of the above-described first and second conditions. That is, in the example shown in FIG. 6, the main magnets 122 are sintered magnets and the auxiliary magnets 123 are bonded magnets, and the magnetization directions of the main magnet 122 and the outer magnet 123a housed in the same magnet slot 121 intersect outside in the radial direction so as to define an acute angle θ.

Figure 7:
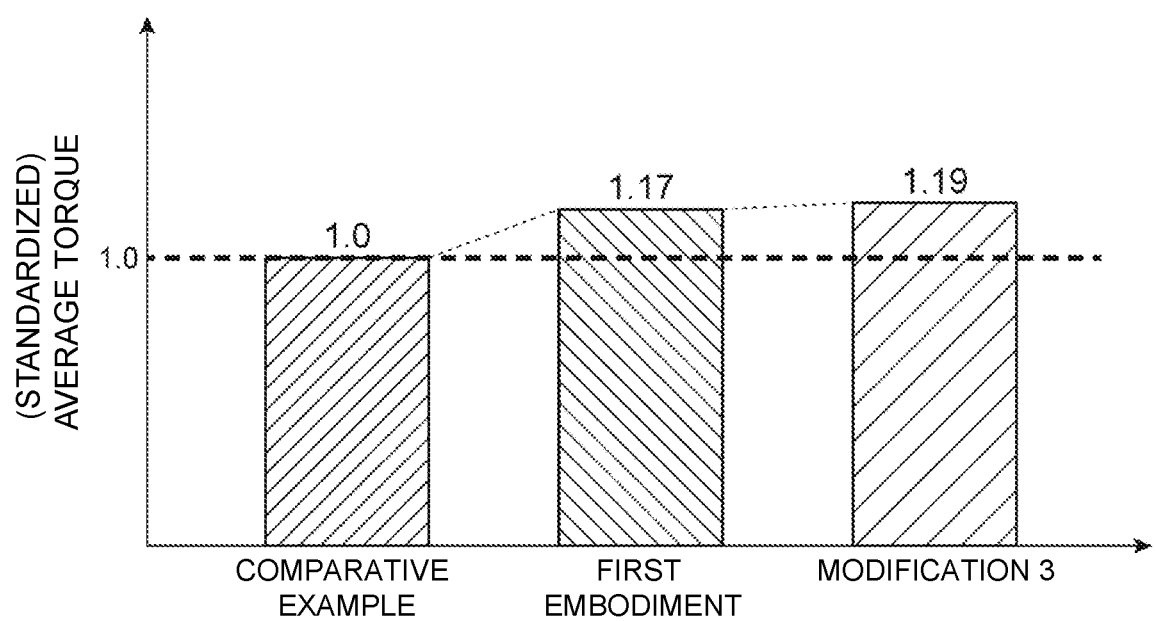
FIG. 7 is a graph showing average torques of the motors according to a comparative example, the first embodiment, and Modification 3.

FIG. 7 is a graph showing the comparison of the average torque of the motor according to a comparative example and the average torques of the motors 100 according to the first embodiment and Modification 3. Here, the motor according to the comparative example has the same configuration as that of the motor 100 shown in FIG. 1 to FIG. 3 except that the motor according to the comparative example does not have the auxiliary magnet 123 as a bonded magnet. In addition, the motor 100 of the first embodiment includes the rotor 120 having the configuration shown in FIG. 3 and the motor 100 of Modification 3 includes the rotor 120 having the configuration shown in FIG. 6. It should be noted that in the motors according to the comparative example, the first embodiment, and Modification 3, the rotor cores 124 have the same lamination thickness, that is, the laminations of the electromagnetic steel plates have the same thickness.

As shown in FIG. 7, since the motor 100 according to the first embodiment satisfies the first condition that the main magnets 122 are sintered magnets and the auxiliary magnets 123 are bonded magnets, the standardized average torque is about 17% higher than that of the motor according to the comparative example not including the auxiliary magnet 123. In addition to the first condition, the motor 100 according to Modification 3 satisfies the second condition that the magnetization directions of the main magnet 122 and the outer magnet 123a housed in the same magnet slot 121 intersect outside in the radial direction so as to define an acute angle θ. Consequently, the standardized average torque of the motor 100 according to Modification 3 is about 19% higher than that of the motor according to the comparative example.

Figure 8:
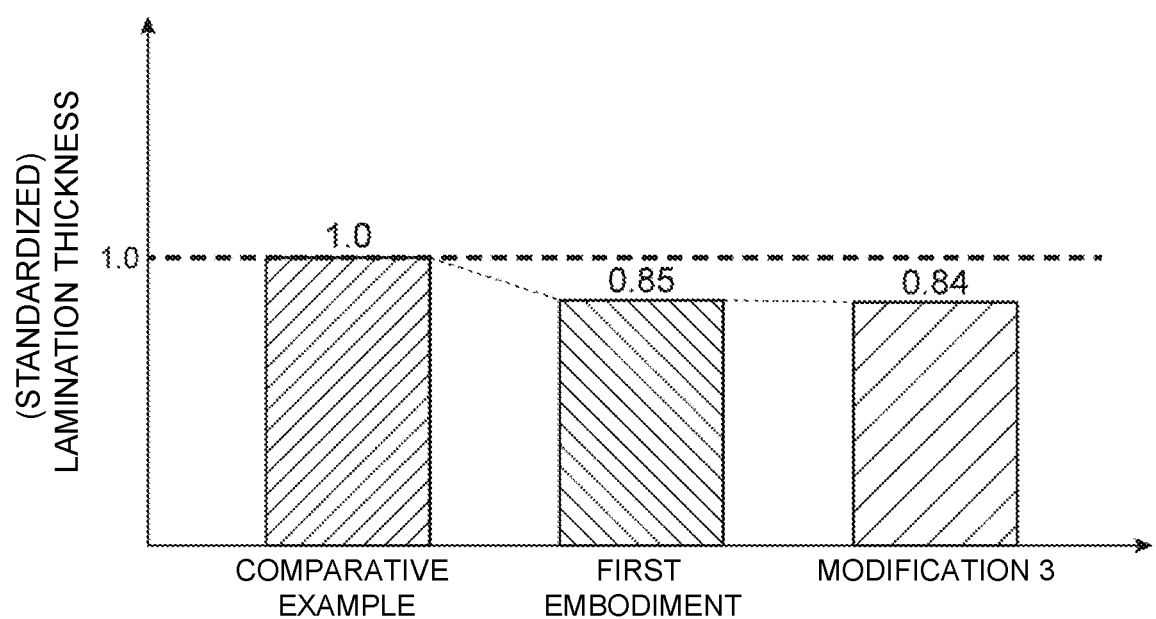
FIG. 8 is a graph showing lamination thicknesses of the motors according to the comparative example, the first embodiment, and Modification 3.

FIG. 8 is a graph showing the comparison of lamination thicknesses between the motor of the comparative example and the motor 100 of the present embodiment. It should be noted that FIG. 8 shows standardized lamination thicknesses required for the motors of the comparative example, the first embodiment, and Modification 3 to output the same torque. As shown in FIG. 8, since the motor 100 according to the first embodiment satisfies the above-described first condition, the standardized lamination thickness is about 15% less than that of the motor according to the comparative example not including the auxiliary magnet 123. In addition to the first condition, since the motor 100 according to Modification 3 satisfies the second condition, the standardized lamination thickness is about 16% less than that of the motor according to the comparative example.

Figure 9:
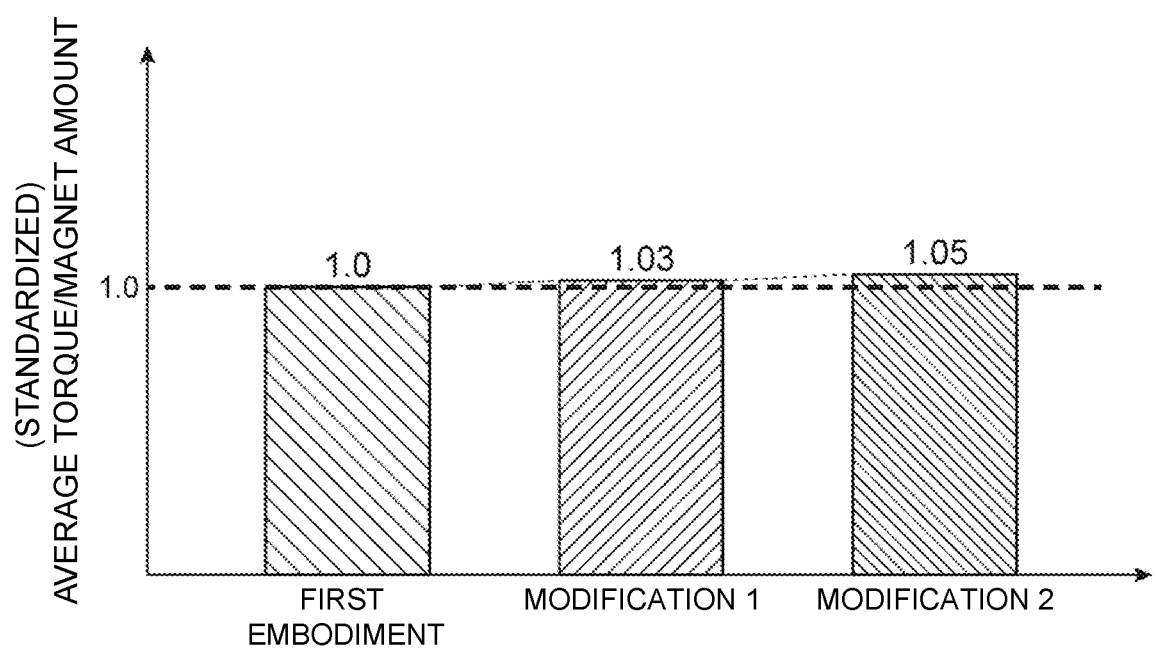
FIG. 9 is a graph showing average torque/magnet amount of the motors according to the first embodiment and Modifications 1 and 2.

FIG. 9 is a graph showing standardized rates of an average torque to a magnet amount (average torque/magnet amount) obtained by the division of the average torques of the motors 100 according to the first embodiment shown in FIG. 3, Modification 1 shown in FIG. 4, and Modification 2 shown in FIG. 5 by their respective magnet amounts. As shown in FIG. 9, suppose that the rate of the average torque to the magnet amount of the motor 100 according to the first embodiment is 1.0, the rate of the average torque to the magnet amount of the motor 100 according to Modification 1 is 1.03 and the rate of the average torque to the magnet amount of the motor 100 according to Modification 2 is 1.03, both of which are higher than that of the motor 100 according to the first embodiment.

As shown in FIG. 9, the first embodiment, Modification 1, and Modification 2 are listed in increasing order of contribution of the magnet amount of the auxiliary magnets 123 to the torque of the motor 100. That is, the outer magnets 123a of the motor 100 of Modification 2 shown in FIG. 5 have the largest contribution to the torque of the motor 100. The inner magnets 123b of the motor 100 of Modification 1 shown in FIG. 4 have the second largest contribution to the torque of the motor 100. The auxiliary magnets 123 housed in the extended portions 121a on the opposite sides in the transverse direction of the main magnet 122 of the motor 100 of the first embodiment shown in FIG. 3 have the smallest contribution to the torque of the motor 100.

Hereinafter, the functions of the motor 100 according to the present embodiment and the motors 100 according to its Modification 1 to Modification 3 will be described.

The motor 100 of the present embodiment includes the rotor 120 and the stator 130 disposed around the rotor 120. The rotor 120 includes the plurality of pairs 121P of the magnet slots 121, the plurality of pairs 122P of the main magnets 122, and the plurality of auxiliary magnets 123. The plurality of pairs 121P of the magnet slots 121, each pair 121P of the magnet slots 121 being arranged in a V-shape opening outward in the radial direction of the rotor 120, are evenly spaced in the circumferential direction of the rotor 120. The plurality of pairs 122P of the main magnets 122 are housed in the plurality of pairs 121P of the magnet slots 121 with their polarities alternately reversed in the circumferential direction so that the north pole and the south pole alternately face outward in the radial direction. The plurality of auxiliary magnets 123 include the outer magnets 123a housed in the outer ends in the circumferential direction in each pair 121P of the magnet slots 121. The motor 100 of the present embodiment satisfies at least one of the first condition that the main magnets 122 are sintered magnets and the auxiliary magnets 123 are bonded magnets or the second condition that the magnetization directions of the main magnet 122 and the outer magnet 123a housed in the same magnet slot 121 intersect outside in the radial direction so as to define an acute angle θ.

The motors 100 according to the first embodiment and Modification 1 to Modification 3 satisfying the first condition can omit a resin mold for fixing the main magnet 122, and can fix the main magnet 122 by filling a bonded magnet into the magnet slot 121 instead of using the resin mold. That is, since the motor 100 satisfying the first condition replaces the resin mold with the bonded magnet, the rotor 120 does not need to be thinner or larger in size for the arrangement of the auxiliary magnets 123. Therefore, while suppressing an increase in the physical size of the motor, the motor 100 satisfying the first condition can increase a magnetic torque as compared to the motor according to the comparative example not including the auxiliary magnet 123 as shown in FIG. 7.

In addition, the motor 100 according to Modification 3 satisfying the second condition can increase a magnetic torque as compared to the motor 100 according to the first embodiment not satisfying the second condition as shown in FIG. 7. That is, by defining the magnetization directions of the main magnet 122 and the auxiliary magnet 123, the motor 100 satisfying the second condition can increase a magnetic torque without increasing a magnet amount as compared to the motor not satisfying the second condition. Therefore, the motor 100 satisfying the second condition can increase a magnetic torque while suppressing an increase in the physical size of the motor.

In addition, in the motor 100 according to Modification 3 satisfying the second condition, the plurality of auxiliary magnets 123 include the plurality of inner magnets 123b housed in the inner ends in the circumferential direction in each pair 121P of the magnet slots 121 as shown in FIG. 6. In the motor 100 according to Modification 3, the main magnet 122 and the inner magnet 123b housed in the same magnet slot 121 are magnetized in the same direction.

With such a configuration, the motor 100 according to Modification 3 can increase a magnetic torque with the inner magnets 123b as shown in FIG. 7. In addition, the motor 100 according to Modification 3 satisfies the first condition as well. Therefore, the motor 100 according to Modification 3 can fix the main magnet 122 by filling the bonded magnet into the magnet slot 121 instead of using the resin mold, and increase a magnetic torque while suppressing an increase in the physical size of the motor, as described above.

In addition, in the motors 100 according to the first embodiment, Modification 1, and Modification 2 satisfying only the first condition, the main magnet 122 and the outer magnet 123a housed in the same magnet slot 121 are magnetized in the same direction as shown in FIG. 3 to FIG. 5.

In the motors 100 according to the first embodiment, Modification 1, and Modification 2, the outer magnet 123a disposed at the outer end in the circumferential direction in each pair 121P of the magnet slots 121 has a larger contribution to the torque as compared to the auxiliary magnet 123 disposed in a different position. Therefore, even if the main magnet 122 and the outer magnet 123a are magnetized in the same direction, the motors 100 according to the first embodiment, Modification 1, and Modification 2 can increase a magnetic torque while suppressing an increase in the physical size of the motor by replacing the resin mold with the bonded magnet.

In addition, in the motors 100 according to the first embodiment and Modification 1, the plurality of auxiliary magnets 123 include the plurality of inner magnets 123b housed in the inner ends in the circumferential direction in each pair 121P of the magnet slots 121 as shown in FIG. 3 and FIG. 4. The main magnet 122 and the inner magnet 123b housed in the same magnet slot 121 are magnetized in the same direction.

With such a configuration, the motors 100 according to the first embodiment and Modification 1 can increase a magnet amount and increase a magnetic torque while suppressing an increase in the physical size of the motor by replacing the resin mold with the inner magnet 123b that is the bonded magnet.

In addition, in the motors 100 according to the first embodiment and Modification 1 to Modification 3, each magnet slot 121 includes the extended portions 121a at its opposite ends in the circumferential direction, and the auxiliary magnets 123 that are bonded magnets are housed in at least part of the extended portions 121a as shown in FIG. 3 to FIG. 6.

With such a configuration, the motors 100 according to the first embodiment and Modification 1 to Modification 3 can fill the bonded magnets into the spaces of the extended portions 121a or replace the resin mold to be filled into the extended portion 121a with the bonded magnet. This can increase a magnetic torque while suppressing an increase in the physical size of the motor 100. In addition, since an uncured bonded magnet can be filled into the extended portion 121a, the auxiliary magnet 123 can be housed, without a gap, in the extended portion 121a having a complex shape.

As described above, according to the present embodiment and its modifications, it is possible to provide the motor 100 capable of increasing a torque while suppressing an increase in the physical size of the motor.

Second Embodiment

Hereinafter, with reference to FIG. 10 to FIG. 14 and also to FIG. 1 and FIG. 2, a second embodiment of the motor according to the present disclosure will be described. The motor 100 of the present embodiment is different from the motor 100 according to Modification 3 of the foregoing first embodiment shown in FIG. 6 mainly in that the auxiliary magnet 123 is not a bonded magnet. Since the other configurations of the motor 100 of the present embodiment are equal to those of the motor 100 according to Modification 3 of the foregoing first embodiment, like reference numerals designate like parts to omit their redundant explanations.

Figure 10:
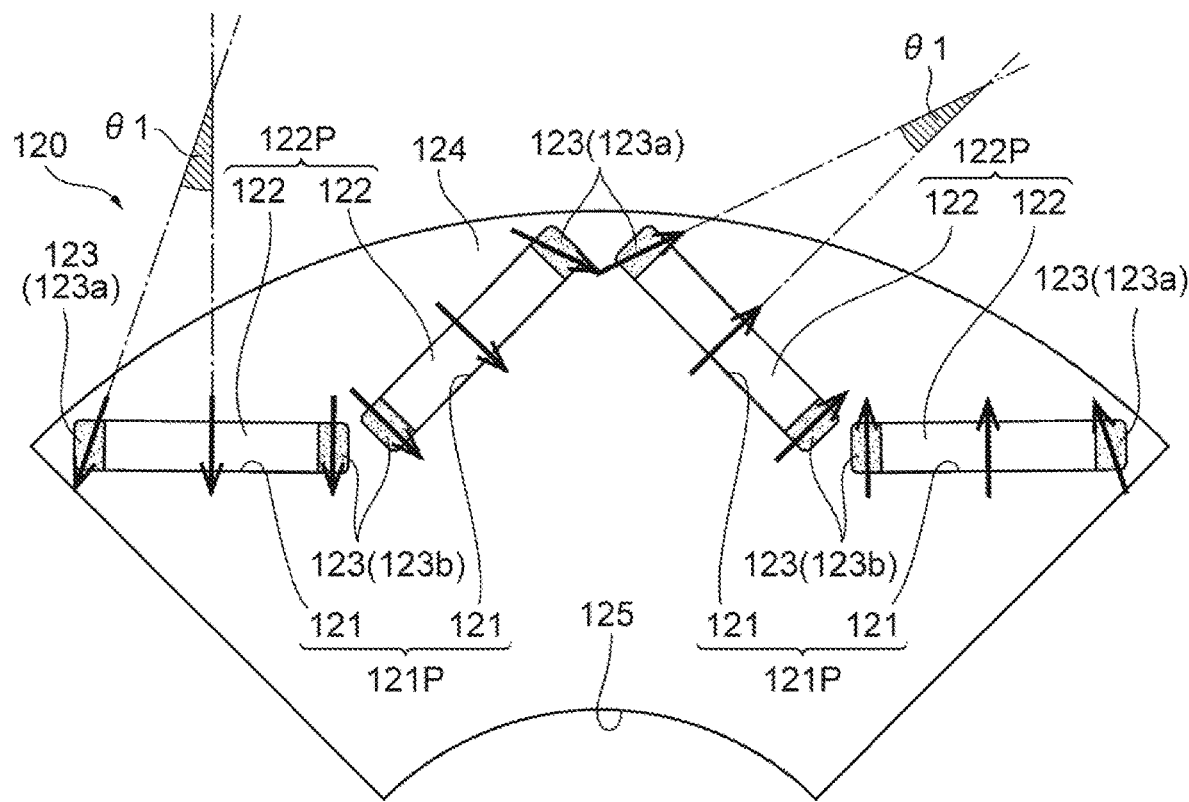
FIG. 10 is an enlarged view of the rotor illustrating a second embodiment of the motor according to the present disclosure.
Figure 11:
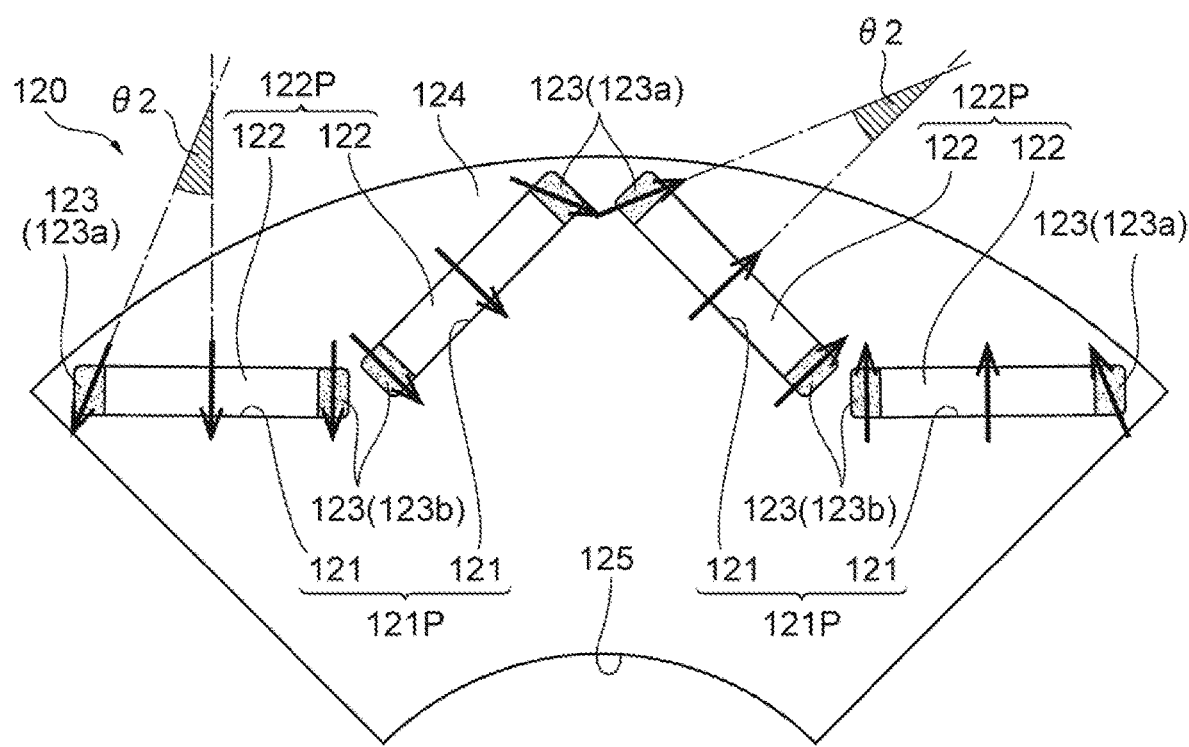
FIG. 11 is an enlarged view of the rotor illustrating Modification 1 of the motor according to the second embodiment of FIG. 10.
Figure 12:
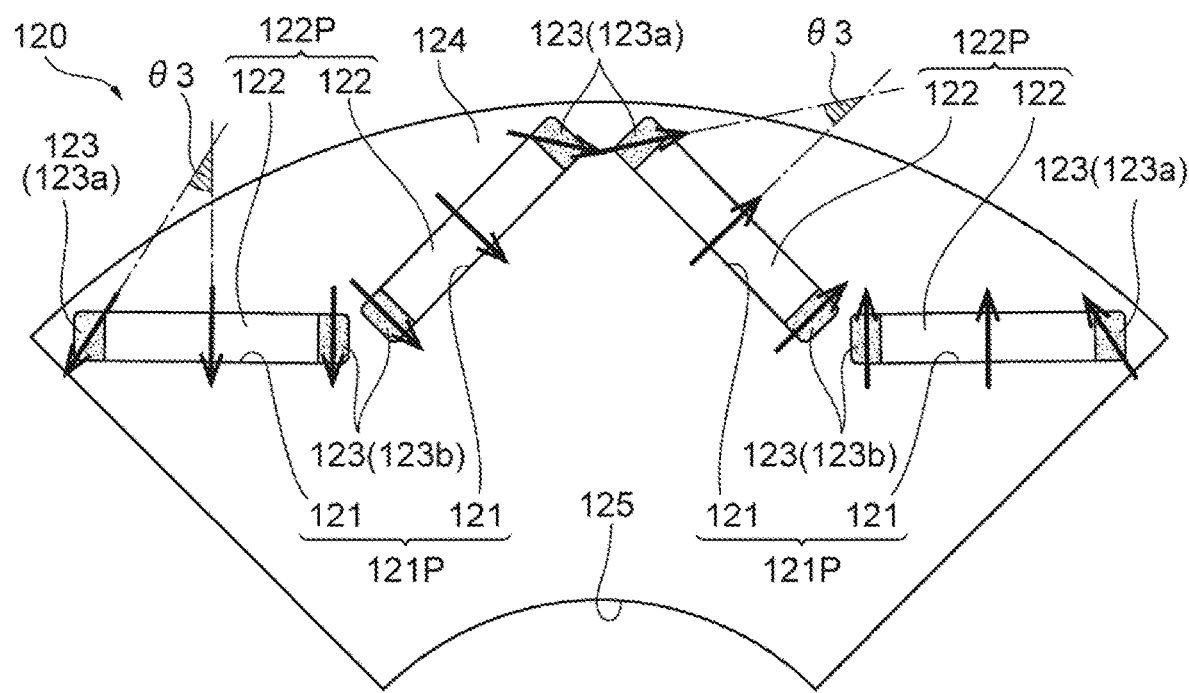
FIG. 12 is an enlarged view of the rotor illustrating Modification 2 of the motor according to the second embodiment of FIG. 10.
Figure 13:
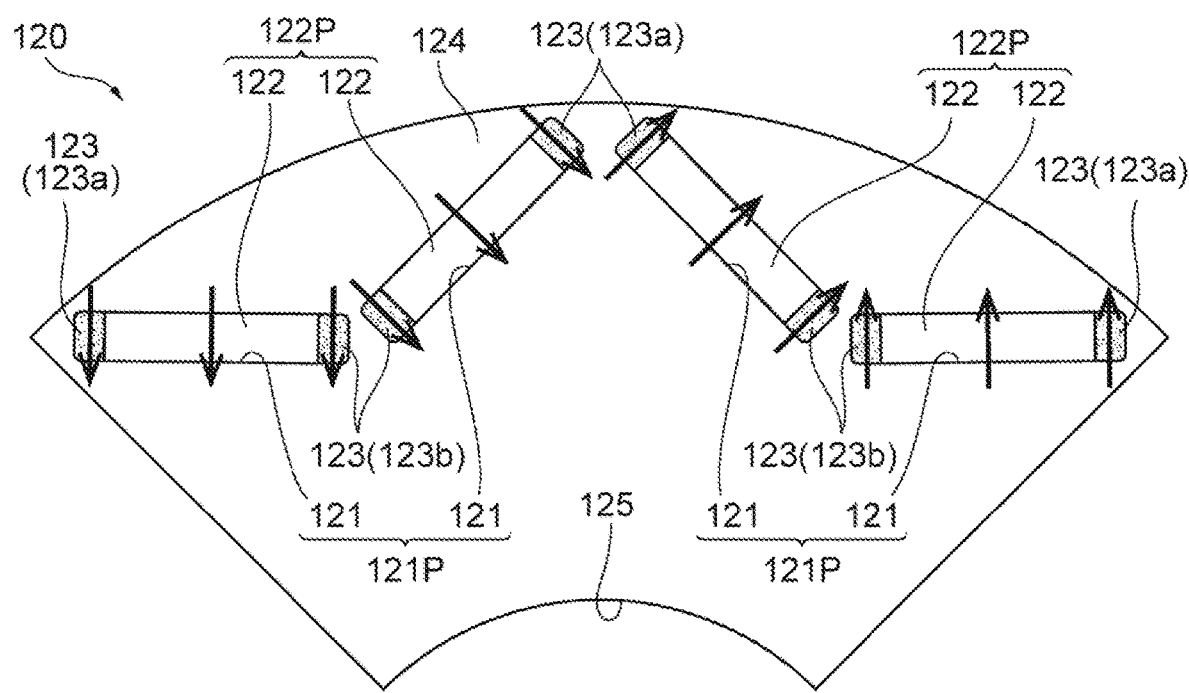
FIG. 13 is an enlarged view of the rotor illustrating the motor according to the comparative example.

FIG. 10 is an enlarged view of the rotor 120 of the motor 100 according to the second embodiment, corresponding to FIG. 3 illustrating the foregoing first embodiment. FIG. 11 and FIG. 12 are enlarged views of the rotors 120 of the motors 100 according to Modification 1 and Modification 2 of the second embodiment shown in FIG. 10, respectively. FIG. 13 is an enlarged view of the rotor 120 of the motor according to the comparative example, which is not included in the motor according to the present disclosure.

In the motors 100 according to the second embodiment and its Modifications 1 and 2 shown in FIG. 10 to FIG. 12 and the motor according to the comparative example shown in FIG. 13, the auxiliary magnets 123 are not bonded magnets, but, for example, sintered magnets like the main magnets 122. Therefore, these motors 100 do not satisfy the first condition that the main magnets 122 are sintered magnets and the auxiliary magnets 123 are bonded magnets.

Meanwhile, the motor 100 according to the second embodiment and the motors 100 according to Modification 1 and Modification 2 of the second embodiment shown in FIG. 10 to FIG. 12 satisfy the second condition. The second condition is that the magnetization directions of the main magnet 122 and the outer magnet 123a housed in the same magnet slot 121 intersect outside in the radial direction so as to define an acute angle θ1, θ2, or θ3. More specifically, the acute angles θ1, θ2, and θ3 shown in FIG. 10 to FIG. 12 are, for example, 10°, 20°, and 30°, respectively.

In contrast, the motor according to the comparative example shown in FIG. 13 satisfies neither the first condition nor the second condition. More specifically, in the motor according to the comparative example shown in FIG. 13, the main magnet 122 and the outer magnet 123a housed in the same magnet slot 121 are magnetized in the same direction, and the angle defined by the magnetization directions of the main magnet 122 and the outer magnet 123a is 0°.

In addition, in the motors 100 according to the second embodiment and its Modifications 1 and 2 shown in FIG. 10 to FIG. 12 and the motor according to the comparative example shown in FIG. 13, the auxiliary magnets 123 include the outer magnets 123a and the inner magnets 123b. Here, in these motors, the main magnet 122 and the inner magnet 123b housed in the same magnet slot 121 are magnetized in the same direction. It should be noted that these motors 100 may not include the inner magnet 123b.

Figure 14:
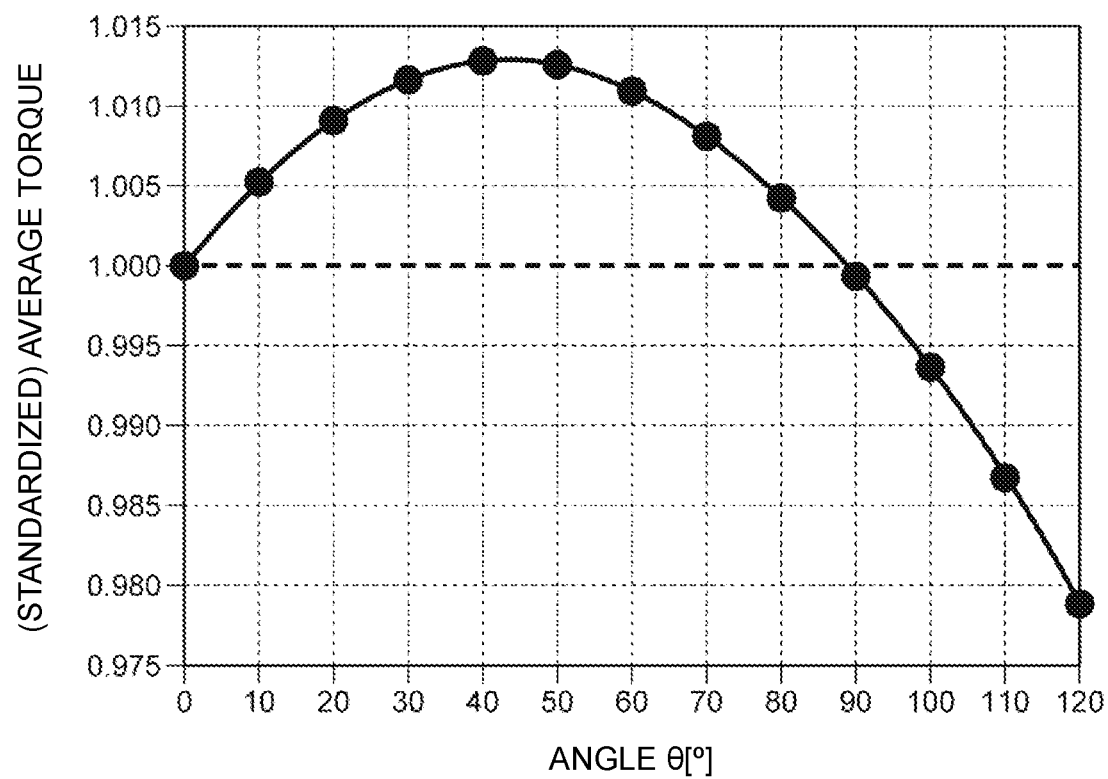
FIG. 14 is a graph showing the relation between an angle defined by a magnetization direction of a main magnet and a magnetization direction of an outer magnet and an average torque.

FIG. 14 is a graph showing an example of the relation between the angle θ defined by the magnetization directions of the main magnet 122 and the outer magnet 123a housed in the same magnet slot 121 and a standardized average torque of the motor. As shown in FIG. 14, the motors 100 according to the second embodiment and its Modifications 1 and 2, in which the magnetization directions of the main magnet 122 and the outer magnet 123a housed in the same magnet slot 121 intersect outside in the radial direction so as to define an acute angle) (0°<θ<90°, have a higher average torque than that of the motor according to the comparative example (θ=0°).

Therefore, according to the motors 100 according to the second embodiment and its Modifications 1 and 2, satisfying the second condition can increase a torque while suppressing an increase in the physical size of the motor as compared to the motor according to the comparative example which does not satisfy the second condition.

Although the embodiments of the motors according to the present disclosure have been described in detail above with reference to the drawings, specific structures are not limited thereto, and any design changes that fall within the spirit and scope of the present disclosure are encompassed by the scope of the present disclosure.

DESCRIPTION OF SYMBOLS

100 Motor
120 Rotor
130 Stator
121 Magnet slot
121a Extended portion
121P Pair of magnet slots
122 Main magnet
122P Pair of main magnets
123 Auxiliary magnet
123a Outer magnet
123b Inner magnet
θ Acute angle
θ1 Acute angle
θ2 Acute angle
θ3 Acute angle

What is claimed is:

1. A motor comprising a rotor and a stator disposed around the rotor, wherein
the rotor includes:
a plurality of pairs of magnet slots evenly spaced in a circumferential direction of the rotor, each pair of magnet slots being arranged in a V-shape opening outward in a radial direction of the rotor;
a plurality of pairs of main magnets housed in the plurality of pairs of magnet slots with their polarities alternately reversed in the circumferential direction so that a north pole and a south pole alternately face outward in the radial direction; and
a plurality of auxiliary magnets including an outer magnet housed in an outer end in the circumferential direction in each of the pairs of magnet slots, and
both of a first condition and a second condition are satisfied, wherein
the first condition is that the main magnets are sintered magnets and the auxiliary magnets are bonded magnets,
the second condition is that magnetization directions of the main magnet and the outer magnet housed in a same one of the magnet slots intersect outside of the rotor in the radial direction so as to define an acute angle,
the plurality of auxiliary magnets include a plurality of inner magnets housed in inner ends in the circumferential direction in each of the pairs of magnet slots, and
the main magnet and the inner magnet housed in a same one of the magnet slots are magnetized in a same direction.

2. The motor according to claim 1, wherein
the magnet slots each include extended portions at opposite ends thereof in the circumferential direction, and
the bonded magnets are housed in the extended portions.

* * * * *